Patented Oct. 3, 1939

2,174,887

UNITED STATES PATENT OFFICE 2,174,887

IMPREGNATION OF POROUS MATERIALS

Edwin F. Kiefer, Cleveland, Ohio, assignor to National Carbon Company, Inc., a corporation of New York No Drawing. Application September 23, 1936, Serial No. 102,257

9 Claims. (Cl. 91—70)

The invention relates to fluid-impervious articles composed chiefly of carbon, and to a process of making such articles.

One method of making carbon articles comprises mixing particles of solid carbonaceous material with a fluid carbonaceous binder such as pitch or tar, forming the mixture to a desired shape, and then baking the mixture. The baking operation drives volatile material from the mixture and converts a part or all of the carbonaceous materials to solid carbon, either amorphous or graphitic, depending upon the composition of the mixture and the time and temperature of heating.

Articles produced in this manner (hereinafter referred to as "baked carbon articles") are ordinarily porous, and are permeable to many fluids, because of the liberation of volatile materials during the baking operation. Although this porosity has not prevented the use of the articles for a wide variety of purposes, there is, nevertheless, a demand for impervious and impermeable carbon articles; notably, for certain types of apparatus used in treating corrosive chemicals.

I have found that certain liquid furans, when in admixture with a suitable catalyst, may be caused to fill the pores of baked carbon articles and then converted to a solid having substantially the same volume as the liquid. Articles so produced are impervious, resistant to a wide variety of corrosives, and possess satisfactory strength.

Suitable furans include furfural, furfuryl alcohol, and mixtures thereof. Although several suitable catalysts for the resinification of furan compounds are known, I prefer to use sulfur chloride in a relatively small proportion, say 5% to 10%, by volume, of the liquid furan.

Furfural and furfuryl alcohol have a low enough viscosity, a low enough molecular weight, and a high enough wetting power for carbon, that they can readily be forced into the pores of a baked carbon article. One convenient way to effect the impregnation is to place the carbon article in an autoclave, to evacuate the air from the autoclave, and then to introduce the mixture of furane and catalyst until the article is submerged therein. The vacuum may then be released and the impregnation carried out at atmospheric or, if desired, superatmospheric pressure.

The mixture of furan and catalyst will slowly resinify in situ at ordinary temperatures. If it is desired to accelerate resinification, the impregnated article may be heated, suitably at 110° C. to 225° C. Preferably, the heating is done under pressure, to prevent loss of furan, and an inert atmosphere, of nitrogen for example, may be used to minimize the danger of fire. An initial pressure of about 100 pounds per square inch will ordinarily be suitable. At these elevated temperatures, resinification is usually complete in about one hour.

The process of the present invention accordingly comprises impregnating a porous carbon article with a liquid furan, preferably of the group consisting of furfural, furfuryl alcohol, and mixtures thereof, in admixture with a catalyst promoting resinification of the furan (preferably sulfur chloride); and thereafter resinifying the furan in situ, preferably with the aid of heat or of heat and pressure.

An article embodying the invention comprises a baked carbon article the pores of which, for at least a substantial distance from the surface of the article, are completely filled with a furan resin formed in situ.

The strength of a porous carbon article is substantially increased by the above-described treatment. In a series of comparative tests on one kind of carbon, the following data were obtained:

| Article * | Tensile strength, lb./sq. in. | | Compressive strength, lb./sq. in. | | Transverse strength, lb./sq. in. | |
|---|---|---|---|---|---|---|
|  | Max. | Min. | Max. | Min. | Max. | Min. |
| 1 | 3168 | 2039 | 9740 | 8160 | 6692 | 5542 |
| 2 | 1512 | 810 | 4240 | 3800 | 3426 | 2072 |

* 1=Impregnated.
2=Unimpregnated.

These high physical strengths indicate that the impregnating material not only fills the pores and renders the article impervious, but also cements the particles together, probably by virtue of the fact that the liquid furan possesses the property of wetting carbon.

I claim:

1. A baked carbon article the pores of which are substantially filled by a resinified liquid furan of the group consisting of furfural, furfuryl alcohol, and mixtures thereof.

2. A baked carbon article the pores of which are substantially filled by a resinified mixture of sulfur chloride and a liquid furan of the group consisting of furfural, furfuryl alcohol, and mixtures thereof.

3. Process for making an impervious article which comprises impregnating a porous carbon article with a resinification catalyst and a liquid furan of the group consisting of furfural, furfuryl alcohol, and mixtures thereof, and resinifying said furan in situ.

4. Process for making an impervious article which comprises impregnating a porous carbon article with a mixture of sulfur chloride and a liquid furan of the group consisting of furfural, furfuryl alcohol, and mixtures thereof, and resinifying said furan in situ.

5. Process for making an impervious article which comprises impregnating a porous carbon article with a mixture of sulfur chloride and a liquid furan of the group consisting of furfural, furfuryl alcohol, and mixtures thereof, and resinifying said furan in situ at a temperature between 110° and 225° C.

6. Process for making an impervious article which comprises placing a porous carbon article in a vacuum, placing in contact with said carbon article a mixture of a resinification catalyst and a liquid furan of the group consisting of furfural, furfuryl alcohol, and mixtures thereof, and releasing said vacuum to force the said mixture into the pores of the carbon article, and then resinifying the furan in situ.

7. Process for making an impervious article which comprises placing a porous carbon article in a vacuum, placing in contact with said carbon article a mixture of a resinification catalyst and a liquid furan of the group consisting of furfural, furfuryl alcohol, and mixtures thereof, and releasing said vacuum and applying superatmospheric pressure to force the said mixture into the pores of the carbon article, and then resinifying the furan in situ.

8. Process for making an impervious article which comprises placing a porous carbon article in a vacuum, placing in contact with said carbon article a mixture of a resinification catalyst and a liquid furan of the group consisting of furfural, furfuryl alcohol, and mixtures thereof, and releasing said vacuum and applying superatmospheric pressure to force the said mixture into the pores of the carbon article, and then resinifying the furan in situ at a temperature between 110° and 225° C. and under a superatmospheric pressure of inert gas.

9. An article of manufacture substantially identical with that produced by the method of claim 3.

EDWIN F. KIEFER.